March 19, 1968   J. C. MARSHALL   3,374,092
HIGH TEMPERATURE BRAZING ALLOYS FOR TUNGSTEN AND
TANTALUM AND ALLOYS THEREOF
Filed Oct. 22, 1965
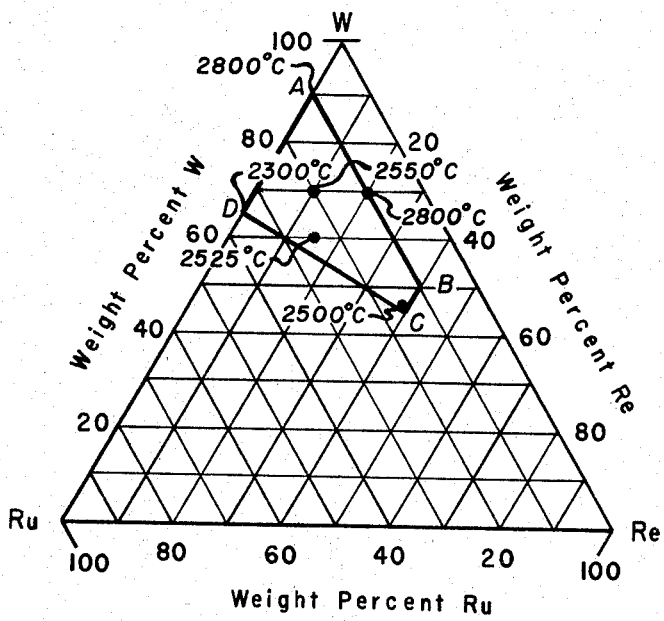
INVENTOR.
James C. Marshall
BY
ATTORNEY.

United States Patent Office 3,374,092
Patented Mar. 19, 1968

3,374,092
HIGH TEMPERATURE BRAZING ALLOYS FOR TUNGSTEN AND TANTALUM AND ALLOYS THEREOF
James C. Marshall, Pottstown, Pa., assignor to the United States of America as represented by the United States Atomic Energy Commission
Filed Oct. 22, 1965, Ser. No. 502,707
1 Claim. (Cl. 75—134)

ABSTRACT OF THE DISCLOSURE

The present invention relates to a ternary brazing alloy for joining a refractory metal selected from tungsten, tantalum, and alloys thereof, containing a predominant amount of said metal, to themselves and to one another, consisting essentially of a ternary alloy containing 10–35 wt. percent ruthenium, 45–90 wt. percent tungsten, and the remainder rhenium, said brazing alloy having a melting point in the range 2300° C.–2800° C.

---

The invention described herein was made in the course of, or under a contract with the U.S. Atomic Energy Commission.

The present invention relates to high temperature braze alloys for joining refractory metals selected from tungsten, tungsten-base alloys containing up to 25 weight percent rhenium, tantalum, and to alloys of tantalum and tungsten in any proportion. More particularly, it relates to, and is an object of this invention to provide, a brazing alloys system for joining structural parts of the selected refractory metals and alloys to form joints which are structurally sound from room temperature to temperatures of the order of 2000° C.

Because of their high strength at extremely high temperatures, tungsten, tantalum, and fabricable alloys thereof, have been contemplated for use as components in nuclear reactors, particularly as the matrix, core, or cladding of nuclear fuel elements. These components are frequently of such complicated geometry as to require sealing or closure to form a complete assembly. Successful use of tungsten and tantalum in this manner is clearly tied to the availability of brazing alloys which possess the requisite combination of properties for forming a structurally sound joint capable of withstanding substantially the same reactor service conditions as the joined base metals.

Joints in tungsten and tantalum can be made by welding, diffusion bonding, as well as brazing. However, when numerous joint configurations and close tolerances are required, brazing is usually the practical method of choice. Of the available brazing alloys for tungsten and tantalum, none have the requisite combination of desirable properties to make a usefully high strength joint. A suitable braze alloy for tungsten, tantalum or alloys thereof must (1) melt cleanly over a narrow (i.e., ±25° C.) range of temperature, above the design temperature service conditions, but below the temperature at which the base metal becomes plastic; (2) flow freely over the faying surfaces of the metals or alloys to be joined; (3) form a clean filleted joint as the braze alloy freezes, without undue penetration of the base metal (i.e., no more than 0.003 inch) in 5 minutes at temperature; and (4) not distort the faying surfaces of the base metal and heat affected area. Moreover, the resultant joint should have a structural integrity and strength approaching, if not equal to, that of the joined metals under the design service conditions.

It is an object of this invention to provide a brazing alloy for joining tungsten, tantalum, and alloys thereof, which have the aforementioned qualities.

The single figure is a ternary equilibrium phase diagram of the W-Ru-Re system on which is delineated the area ABCD corresponding to the composition of the brazing alloys of the present invention.

The braze alloys included in this invention consist of, in weight percent, 45–90 tungsten, 10–35 ruthenium, and 0–40 rhenium. Alloys with this range of composition allow a selection of brazing temperatures between 2300° C.–2800° C. while meeting all of the aforementioned brazing requisities. This range of temperature is particularly appropriate for joining tungsten or tantalum or alloys having such metals as a major alloying ingredient where the joined assembly is designed for service conditions at a temperature in the range 1200° C.–2100° C. Amounts of rhenium or ruthenium beyond those enclosed by the area ACBD lead to development of an excess amount of a brittle sigma precipitated phase which prevents formation of a crack-free joint. Thus, the lines BC and CD are limited by the adverse development of sigma phase in alloys beyond the enclosed area bounded by these lines. Alloys with less than 10% ruthenuim are too close to the melting point of tungsten. Thus, the lines AB is limited by a very rapid rise in melting point below 10% ruthenium.

The melted braze alloy flows freely on clean faying surfaces of the selected base metals or alloys and forms smooth, crack-free fillets on freezing. Sound joints are formed when the faying surfaces are in contact or separated by as much as 0.010 inch.

The braze alloys can be formed by any one of several procedures which will insure homogeneity and minimum contamination. For example, high purity powders of the desired composition can be pressed into a bar or electrode, and then arc-melted, preferably in vacuum or in an inert gas atmosphere such as argon. The base alloy is too brittle to form into rods or bars, but can be used as powder or chunks for brazing purposes.

Brazing with these alloys is obtained in a conventional manner. The faying surfaces are placed in abutting relationship either in contact or separated by a space up to about 0.010 inch. The braze alloy is then placed between and around the faying surfaces and the joint area is heated to above the melting point of the selected braze alloy in an inert atmosphere such as argon or in hydrogen. Complete flow of the braze alloy at or above its melting point is attained by holding at temperature for a period of 1–5 minutes depending on the thickness and geometry of the faying surfaces. After complete flow of the braze alloy is effected the joint area is cooled in $H_2$ or inert atmosphere to room temperature in a cooling cycle which allows a smooth, clean fillet to be formed. In several experimental runs T-joints formed from the compositions within the defined area formed small even fillets with excellent flow characteristics at the melting temperature. Penetration of the base metal was less than 0.003 inch in the heat affected area. Photomicrographs of the joint area showed a fine-grained area with no cracks or porosity throughout the thickness of the joint in each case.

What is claimed is:

1. A ternary brazing alloy for joining a refractory metal selected from tungsten, tantalum, and alloys thereof, containing a predominant amount of said metal to themselves and to one another, consisting of 10–35 wt. percent ruthenium, 45–90 wt. percent tungsten, and the remainder rhenium, said brazing alloy having a melting point in the range 2300° C.–2800° C.

References Cited

GEMP–41A, High Temperature Materials Program Progress Report No. 41, part A, Nov. 30, 1964, relied on pp. 27–40.

WADD Technical Report 60–132, Refractory Metal Constitution Diagrams, October 1960, relied on pp. 31–35 and 49.

CHARLES N. LOVELL, *Primary Examiner.*